Feb. 4, 1947.   K. FREI   2,415,091
APPARATUS FOR KNEADING AND MIXING RUBBER
Filed July 22, 1939

Inventor:
K. Frei
By: Glascock Downing & Seebold
Attys.

Patented Feb. 4, 1947

2,415,091

UNITED STATES PATENT OFFICE 2,415,091

APPARATUS FOR KNEADING AND MIXING RUBBER

Karl Frei, Oberesslingen, Germany; vested in the Alien Property Custodian

Application July 22, 1939, Serial No. 286,038
In Germany August 2, 1938

5 Claims. (Cl. 18—2)

This invention relates to apparatus for kneading and mixing rubber and other plastic materials of a like or similar nature.

Generally speaking, two different types of machines are known for this purpose, namely, mixing rolls and kneading and mixing machines, both types being available in single or double spindle design.

In the case of mixing rolls the actual mixing process is confined solely to that point at which the two rolls approach nearest to one another and impart to the rubber substance a characteristic pushing and masticating motion. The use of mixing rolls is a comparatively tedious and lengthy operation, for which reason in many instances kneading and mixing machines are found to be preferable.

The double-spindle kneading and mixing machines have two mixing rolls, which are mounted parallel to one another and are each rotatable in a depression of semi-cylindrical cross-section in the bottom of a trough. The mixing rolls themselves consist of rotatable cylindrical bosses extending through the trough longitudinally and having thereon one or more wings, ribs or blades of equal or unequal pitch. The mixing rolls are usually rotated in opposite directions. The actual mixing and kneading process carried out on the material situated in the space between the rolls, the blades and the side of the trough is always effected in such a way that the material is carried by the mixing rolls to a point above a so-called saddle and by the opposite rotation of the rolls is there kneaded together. This method of kneading and mixing requires a comparatively long time and necessitates extremely heavy and expensive machines.

As already stated, single-spindle machines for kneading and mixing rubber are also known. In these machines a longitudinally disposed shaft furnished with mixing blades and rotatable about its own axis operates in a hollow cylindrical container. The mixing blades are arranged diametrically opposite to one another on their common shaft, usually in helical disposal according to a certain pitch. Owing to the provision of the blades on a common shaft and the uniform speed and direction of rotation of the blades thus brought about there is always considerable danger of the rubber or like material being rolled or balled together. It is for this reason that machines of this character for the treatment of rubber or like substances have not acquired any significance in practice.

An object of the invention is to eliminate the disadvantages attendant the previously known methods of kneading and mixing rubber and like materials and the machines employed for this purpose, and to provide apparatus by which the kneading and mixing operation can be carried out much more effectively, rapidly and cheaply than heretofore.

Whereas in the known machines the kneading and mixing operation has been carried out in practice in the space between two elements disposed parallel to one another, the kneading and mixing operation according to the invention takes place in a space which is not parallel to the longitudinal axis or axis of rotation of the kneading and mixing elements, but is disposed transversely thereto.

According to the invention, the material to be kneaded and mixed is forced axially always in the one direction, towards the interior of the trough, in a positive fashion into the transversely disposed space, where it is subjected to a treading, squeezing and drawing action between the relatively rotating kneading and mixing elements, and thus to a very peculiar but nevertheless extremely rapid and efficient kneading and mixing process.

The invention is illustrated by way of example in the accompanying drawing, in which Fig. 1 is a section through the improved machine according to the invention taken on the line I—I in Fig. 2.

Figure 1:
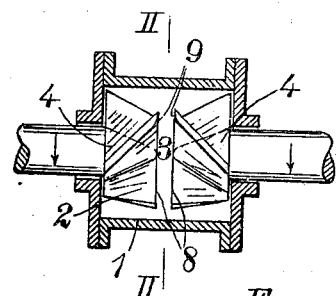
Figure 2:
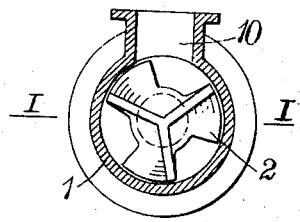
Fig. 2 is a cross-section on the line II—II in Fig. 1.
Figure 5:
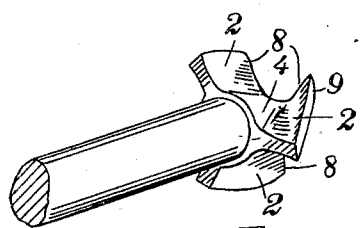
Fig. 5 is a perspective view of a preferred embodiment of kneading and mixing element.

With reference to the drawing, two kneading and mixing tools are arranged in a kneading and mixing trough 1, which can be closed on all sides or may also be partially open, not as heretofore in parallel disposal side by side, but axially opposite to one another. In Fig. 1 both kneading and mixing elements are rotatable independently of one another. The design of the kneading and mixing elements intended for a machine according to Figs. 1 and 2 is disclosed in a preferred embodiment in Fig. 5.

Figure 3:
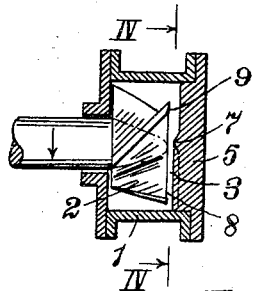
Fig. 3 is a sectional view of an embodiment, in which one of the two mixing elements situated axially opposite to one another is arranged to be stationary.
Figure 4:
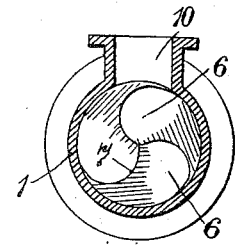
Fig. 4 is a cross-section taken on the line IV—IV in Fig. 3, viewed in the direction of the arrows.

The kneading blades or wings 2 of these elements are each mounted on a boss 4, which is conveniently tapered in the direction towards the space 3 and is preferably of conical form, the blades or wings having a certain angle of pitch with respect to the axis of rotation of the boss, so that the material being treated is always forced towards the interior of the trough into the space 3 formed between the two elements transversely to their axis of rotation. The direction of rotation of the kneading and mixing elements may either be equal or opposite dependent on the disposal of their wings or blades. If their direction of rotation is the same, the speeds of rotation must be different. If they rotate in opposite directions, their speed of rotation can be selected as desired, and if necessary they can be allowed to rotate at equal speeds. It is also possible under the invention to arrange for one of the two mixing and kneading elements to be stationary, in which connection reference is made by way of example to the embodiment illustrated in Fig. 3.

In this case only the element shown on the left is arranged for rotation, while the co-operating element is mounted rigidly in the machine or its trough. In the embodiment according to Fig. 3 the stationary element is designated 5 and comprises in substance a disc, which on its end face directed towards the rotary element is furnished with recesses 6, so that between the latter ribs or projections 7 acting as blades are formed, which serve to guide the material under treatment towards the space 3 in substantially the same fashion as the blades of a kneading and mixing element (which if desired may also be stationary) in the embodiment according to Fig. 1.

The blades, wings or ribs can be provided in any desired number and with any desired pitch. In the case of kneading and mixing elements having a plurality of wings all of the wings, blades or ribs may have the same pitch or may differ in pitch. Further, the wings in the case of kneading and mixing elements having a plurality of wings may have the same radial dimensions or different radial dimensions. Moreover, a relatively slowly rotating kneading and mixing element may have a larger number of wings, blades or ribs than a co-operating, rapidly rotating kneading and mixing element. Similarly, the pitch angles of the wings of a comparatively slowly rotating kneading and mixing element may be larger than those of a co-operating rapidly rotating element.

The size of the operating space 3 between the oppositely disposed kneading and mixing elements will depend substantially on the nature of the material being mixed and kneaded.

It is not essential that the space between all end edges 8 of the wings or blades of both elements be of the same extent. The blades or wings may also be of different size longitudinally to the axis of rotation and may also have different forms. The arrangement may also be such that the width of gap between the end edges 8 or 7 of the wings or blades rotating one past the other varies regularly or irregularly. It is advisable to round off the end edges of the blades—as clearly indicated at 9 in Fig. 5—so that they will at no time exercise a cutting or direct shearing action on the material in the operating space 3 but, on the contrary, assist in forcing the material to be kneaded into the space 3 and subjecting it to friction.

The material to be kneaded and mixed is introduced through an opening 10, which will usually be situated at the top of the trough, and is thus immediately subjected to the action of the kneading and mixing elements. The kneading and mixing elements either rotating in the same direction at different speeds or in different directions at the same or different speeds draw the material definitely into the trough by means of the oblique blades, ribs or wings and force it axially into the space 3. In the space 3 a rapid and highly effective kneading and mixing action takes place, the end edges 8 of the elements rotating past one another acting on the material with a frictional, squeezing, treading and pulling effect and also with a tendency to press the material together. The speed of rotation of the elements in relation to one another, the pitch of the blades or wings, the width of the working space, and the cohesive, adhesive and friction capacity of the material being kneaded are naturally factors which must also be taken into account in the specific design of the machine, but these do not alter the fundamental idea of the invention which, as it will be appreciated, resides in the kneading and mixing of the material in a space situated transversely to the axis of rotation of the kneading and mixing elements.

The saddle effect on the material under treatment hitherto occurring in the machines having kneading and mixing elements disposed parallel to one another and taking place only once upon each revolution occurs in the machine according to the invention in a multiplied form dependent on the number of blades or wings provided.

The open character of the kneading and mixing elements in the direction towards the transverse space results in the interior of the trough, longitudinally thereof, in a multiplicity of hollow spaces in which the material can be taken up in comparatively large quantities, to be forced axially towards the centre, or in other words towards the transverse space. As there are no shafts passing longitudinally through the trough as supports for the kneading wings or blades, the latter each being arranged independently on a boss, and these bosses being arranged axially opposite to one another to leave a certain intermediate space and preferably being of conical form, the new machine possesses a considerably greater capacity than the known kneading and mixing machines having a trough of the same size.

It will be understood that no limitation is made to the specific embodiments illustrated in the drawing, and that numerous modifications are quite possible within the meaning of the above description and the annexed claims without departing from the spirit of the invention.

What I claim as new and desire to secure by Letters Patent is:

1. In a machine for kneading and mixing rubber and like plastic substances, a trough, two independently rotatable kneading and mixing elements arranged on separate shafts axially opposite to one another within said trough to leave between them a transverse space, a conical boss on each element tapering toward the said space, and a plurality of blades, circumferentially spaced on each boss, each blade being angularly disposed relative to the axis of the element, and extending to the end of the element, for conducting the substance axially into the transverse space.

2. In a machine for kneading and mixing rubber and like plastic substances, a trough, two independent kneading and mixing elements arranged axially opposite each other on separate shafts within said trough, the adjacent ends of said elements being spaced from each other to provide a free transverse space between the elements, and means carried by said elements terminating at the adjacent ends thereof for conducting the substance axially into said transverse space without obstructing the space.

3. In a machine for kneading and mixing rubber and like plastic substances, a trough, two independent kneading and mixing elements arranged axially opposite each other on independent shafts within said trough, the adjacent ends of said elements being spaced from each other to provide an unobstructed transverse space between the ends of the elements, and a plurality of blades carried by each of said elements arranged circumferentially spaced about and at an angle with respect to the axis of said elements and extending to the ends thereof for conducting the substance axially into said transverse space.

4. In a machine for kneading and mixing rubber and like plastic substances, a trough, two independent kneading and mixing elements arranged coaxially opposite each other on independent shafts within said trough, the adjacent ends of said elements being spaced from each other to provide a free transverse space between the elements, circumferentially spaced blades carried by each of said elements arranged at an angle with respect to the axis of said element for conducting the substance axially into said transverse space, said blades terminating at the ends of said elements to avoid obstruction of said space, and the peripheral edges of said blades sloping towards said transverse space.

5. In a machine for treating a plastic substance, the combination of a casing forming a chamber to receive the substance; a single conduit connected with the interior of the casing for charging the casing with the substance; a pair of kneading elements disposed in said casing in coaxial spaced relation, adapted to be relatively movable, and having their peripheries spaced from the inner surface of the casing, so that there is a circumferential space about said elements, and a transverse space between said elements, said conduit being so disposed as to introduce the substance into the circumferential space, and said elements being shaped to force the substance into the transverse space.

KARL FREI.

REFERENCES CITED

The following references are of record in the file of this patent:

UNITED STATES PATENTS

| Number | Name | Date |
|---|---|---|
| 1,354,452 | Bowen et al. | Sept. 28, 1920 |
| 1,523,184 | Eger | Jan. 13, 1925 |
| 396,448 | Winchell | Jan. 22, 1889 |
| 692,243 | Copenhaven | Feb. 4, 1902 |
| 1,925,049 | Howard | Aug. 29, 1933 |

FOREIGN PATENTS

| Number | Country | Date |
|---|---|---|
| 397,962 | Germany | June 28, 1924 |
| 172,977 | British | Feb. 23, 1922 |
| 409,577 | Germany | Feb. 7, 1925 |
| 409,966 | Germany | Feb. 20, 1925 |